United States Patent
Shklarsky et al.

(10) Patent No.: US 7,403,742 B2
(45) Date of Patent: Jul. 22, 2008

(54) MULTI-BAND CELLULAR SERVICE OVER CATV NETWORK

(75) Inventors: Dan Shklarsky, Hifa (IL); Harel Golombek, Netanya (IL); Mordechai Zussman, Kiriat Bialik (IL)

(73) Assignee: Passover, Inc., Wilmington, DE (US)

( * ) Notice: Subject to any disclaimer, the term of this patent is extended or adjusted under 35 U.S.C. 154(b) by 457 days.

(21) Appl. No.: 10/476,412

(22) PCT Filed: May 1, 2002

(86) PCT No.: PCT/US02/11867

§ 371 (c)(1),
(2), (4) Date: Apr. 20, 2004

(87) PCT Pub. No.: WO02/091618

PCT Pub. Date: Nov. 14, 2002

(65) Prior Publication Data

US 2005/0176458 A1     Aug. 11, 2005

Related U.S. Application Data

(60) Provisional application No. 60/287,705, filed on May 2, 2001.

(51) Int. Cl.
    *H04B 3/36* (2006.01)
(52) U.S. Cl. .......................... 455/14; 455/523; 725/106
(58) Field of Classification Search .................. 455/523, 455/414, 3.01, 7–10, 454, 1.1, 14, 6.3; 725/106, 725/126–128; 370/315

See application file for complete search history.

(56) References Cited

U.S. PATENT DOCUMENTS

| | | | | |
|---|---|---|---|---|
| 5,425,027 A * | 6/1995 | Baran | ....................... | 370/395.6 |
| 5,488,413 A * | 1/1996 | Elder et al. | .................. | 725/106 |
| 5,638,422 A * | 6/1997 | Roman | ..................... | 455/562.1 |
| 5,642,155 A * | 6/1997 | Cheng | ......................... | 725/119 |
| 5,809,395 A | 9/1998 | Hamilton-Piercy et al. | | |
| 5,822,678 A * | 10/1998 | Evanyk | ...................... | 725/106 |
| 5,953,670 A * | 9/1999 | Newson | ..................... | 455/454 |
| 6,161,011 A | 12/2000 | Loveless | | |
| 6,349,200 B1 * | 2/2002 | Sabat et al. | .................. | 455/403 |
| 6,963,552 B2 * | 11/2005 | Sabat et al. | .................. | 370/338 |
| 2001/0036163 A1 * | 11/2001 | Sabat et al. | .................. | 370/328 |
| 2002/0059615 A1 * | 5/2002 | Okawara et al. | .............. | 725/78 |
| 2004/0244053 A1 * | 12/2004 | Golombek | ................... | 725/127 |

OTHER PUBLICATIONS

U.S. Appl. No. 10/474,807, filed Oct. 14, 2003 by Dan Shklarsky, et al, entitled, "Third Generation Mobile Service Overt CATV Network".

U.S. Appl. No. 10/296,042, filed Nov. 21, 2002 by Dan Shklarsky, et al, entitled, "Mobile Radio Service Overt CATV Networks".

U.S. Appl. No. 10/486,692, filed Feb. 13, 2004 by Harel Golombek, entitled, "Cable TV Network Frequency Range Extension with Passive By Pass Device".

* cited by examiner

*Primary Examiner*—Edward Urban
*Assistant Examiner*—Raymond S. Dean
(74) *Attorney, Agent, or Firm*—Sughrue Mion, PLLC

(57) ABSTRACT

A CATV network is modified with a secondary transmission (CBP) by adding filters to separate modified mobile-communications frequencies. A CATV terminal can be routed to cellular network by way network coupling devices (NCD).

26 Claims, 15 Drawing Sheets

MULTI-BAND CELLULAR SERVICE OVER CATV NETWORK

CROSS-REFERENCE TO RELATED APPLICATIONS

This application claims the benefit of U.S. Provisional Application No. 60/287,705, filed May 2, 2001, which is incorporated by reference, herein, in its entirety.

BACKGROUND OF THE INVENTION.

1. Field of the Invention

This description relates to a new system and topology for providing cellular service in multiple bands by using a cable TV network. The system can improve the in-building coverage and the total available capacity of different cellular networks, using the same CATV network. These cellular networks may have multiple air interfaces, different frequency bands and may be operated, simultaneously, by different cellular service providers. As used herein, the terms "mobile", "cellular", and "wireless" are meant generically to refer to radio systems or networks such as UMTS, GSM900, GSM1800, PCS1900, TDMA800, CDMA800, CDMA2000 1X/3X, or PDC. Other types are known, and still other types may be hereafter developed, and it will be appreciated that "mobile", "cellular", and "wireless" are terms intended to include all such systems.

In particular, this description relates to an extension to conventional mobile radio networks using cable TV or HFC (Hybrid Fiber Coax) networks (and the like, all referred to generally as CATV networks, hereafter). To be even more specific, there is described an approach to merging CATV networks into mobile radio networks to provide improved voice & data services and coverage, while enhancing network capacity; to providing in-building access for any combination of mobile radio terminals, in a mobile radio network; to combining and carrying any combination of mobile radio signals on the CATV system, without interfering with each other, or the CATV service.

2. Related Work

The basic theory by which mobile radio and cellular networks operate is well known. Geographically distributed network access points, each defining cells of the network, characterize cellular radio networks. The geographically distributed network access points are typically referred to as base stations BS or base transceiver stations BTS, and includes transmission and reception equipment for transmitting signals to and receiving signals from mobile radio terminals (MT). Here, a MT includes not only a normal cellular phone, but any device capable of performing cellular communications. Each cell (or sector) is using only part of the total spectrum resources licensed to the network operator, but the same capacity resources (either frequency or code), may be used many times in different cells, as long as the cell to cell interference is kept to a well defined level. This practice is known as the network reuse factor. The cells may be subdivided further, thus defining microcells. Each such microcell provides cellular coverage to a defined (and usually small) area. Microcells are usually limited in terms of their total available capacity.

One problem needing to be solved is the inability of present frequency or code reuse techniques (sectorization and cell-area subdivision) to deal with the "third dimension" problem. Cellular networks have no means to deal with the problem of user terminals at higher-than-usual elevations, e.g. upper floors of high-rise office or residential buildings. The overall demand for mobile services has caused cellular network operators to develop an intensive network of BTSs in urban areas. This has improved spectrum utilization (increased network capacity) at ground level, but has aggravated the problem in high-rise buildings where MTs now 'see' several BTSs on the same frequency or code.

Cells in a cellular radio network are typically connected to a higher-level entity, which may be referred to as a mobile switching center (MSC), which provides certain control and switching functions for all the BTSs connected to it. The MSCs are connected to each other, and also to the public switched telephone network (PSTN), or may themselves have such a PSTN interface.

The conventional implementation of mobile radio networks has had some important limitations. When operating above 1 GHz, it is necessary in a conventional mobile radio network to build numerous base stations to provide the necessary geographic coverage and to supply enough capacity for high-speed data applications. The base stations require an important amount of real estate, and are very unsightly.

Another limitation is that, since cellular towers are expensive, and require real estate, it is economically feasible to include in a network only a limited number of them. Accordingly, the size of cells might be quite large, and it is therefore necessary to equip the mobile radio terminals with the ability to radiate at high power so as to transmit radio signals strong enough for the geographically dispersed cellular towers to receive.

As the cell radius becomes larger, the average effective data rate per user in most packet based protocols decreases accordingly and the high-speed data service might deteriorate.

Yet another limitation to cellular radio networks as conventionally implemented is that the cellular antennas are typically located outside of buildings, even though it would be highly beneficial to provide cellular service inside buildings. The penetration of cellular signals for in-building applications requires high power sites, or additional sites or repeaters to overcome the attenuation inherent with in-building penetration. As frequency increases, the in-building signal level decreases accordingly. Because the base station antennas are located outside of buildings, it is difficult for mobile radio terminals to transmit signals strong enough to propagate effectively from inside of the building to outside of the building. Therefore, the use of mobile terminals inside buildings results in reduced data rate and consumes a substantial amount of the limited battery time.

Yet another limitation of mobile radio networks as conventionally implemented is the inherent limited capacity of each and every BTS to provide voice and data service. This capacity shortage is due to the way the spectrum resources are allocated to each BTS. To provide for reasonable voice and data quality, each BTS can use only a part of the total spectrum resources owned by the cellular operator. Other BTSs can reuse the same part of the spectrum resources as a given BTS, but a pattern of geographic dispersion has to be respected. This is called a code reuse factor for CDMA based technologies, and frequency reuse factor for TDMA based technologies.

Because CATV is so ubiquitous today, even in rural areas, it becomes very interesting to attempt to overcome the above identified limitations of cellular systems by taking advantage of the bandwidth of the CATV networks.

FIG. 1 shows a CATV system, in highly simplified schematic form. In the CATV system, the CATV head end is connected to a CATV cable network. The CATV cable network includes various equipment, such as amplifiers. Most CATV networks today are bidirectional. That is to say, communications from the CATV head end toward the end user (i.e., downstream communications) and also communications from the end user to the CATV head end (i.e., upstream communications) are possible.

The CATV network shown in FIG. 1 is a bidirectional system. The CATV amplifiers are bidirectional as well. Upstream communications are carried in a relatively narrow band of 5-45 MHz. Downstream communications are carried in a relatively wide band of 50-750 MHz or 50-860 MHz, depending on the particular system.

The communications traveling downstream from the CATV head end are passed on through a tree-shaped network to a set-top box (STB). The STB connects to the television set. Of course, it is quite possible that the television set includes the appropriate equipment to allow the connection of the cable without the use of a STB. Likewise, there might be a cable modem or other related device. For convenience, herein, STB is used to mean any devices of this kind.

FIG. 2 shows a conventional approach to carrying bidirectional cellular communications over such a network. In this approach, the public land mobile network (PLMN) is connected to the cable system via an interface I/F. Downlink communications from the PLMN are carried through the CATV amplifiers, and the CATV network through a remote antenna driver (RAD). The RAD takes the downlink communications and broadcasts them to an MT.

Upstream communications from the mobile terminal travel through the RAD, and through the upstream portion of the bandwidth, through the CATS amplifiers, through the I/F, and then to the PLMN. Naturally, frequency conversion is necessary at the RAD so that the uplink communications can be put into the upstream bandwidth of the CATV network.

The prior approaches for carrying wireless signals over the CATS network include re-arranging or re-packaging the original radio signal to fit into the existing CATV standard frequencies (5-45 MHz and 50-750/860 MHz) and channels. This is typically done by active elements, which up- and down-convert the wireless frequencies to match the known standard CATV operational frequencies in the standard CATS upstream and downstream frequencies. Using the standard CATV channels, however, reduces the available bandwidth of the CATV operators in providing video, data and voice according the common CATV standards like DOCSIS and DVB.

Such approaches have all been disadvantageous, however. In particular, if one wishes to re-arrange and re-pack the full UMTS frequency band (1920-1980 MHz, 2110-2170 MHz) into the standard CATV channels, one finds that the UMTS uplink bandwidth (60 MHz) is too large, and hence impossible for the CATV upstream (40 MHz) to carry. Even if a smaller UMTS bandwidth were to be carried over the CATV upstream, this would dramatically reduce the scarce upstream CATV resource. Some patent documents representing such disadvantageous approaches are now summarized.

U.S. Pat. Nos. 5,802,173 and 5,809,395 (related patents) describe a radiotelephony system in which cellular signals are carried over a CATV network. However, uplink cellular communications are frequency converted to "in the range 5 to 30 MHz". Such a conversion is necessary because the CATV network is normally frequency-divided into two bands: a high band which handles downstream transmission (head-end to hub to subscriber) and a low band which handles upstream transmission (subscriber to hum to head end). In other words, any upstream signals or communications over about 45 MHz are filtered out by the CATV network itself as a part of the normal operation of the network. Under the '173 approach, upstream communications all must be fit into the low Sand (i.e., in "a portion of the frequency spectrum allocated in the CATV system for upstream communications").

U.S. Pat. No. 5,828,946 describes a CATV based wireless communications scheme. Under the '946 approach, to avoid multiple outdoor cellular receptions from causing noise over the CATV network, only the signals received at a sufficient power level are converted and sent upstream.

U.S. Pat. No. 5,822,678 acknowledges that the frequency-divided nature of CATV networks is a problem. In particular, the '678 patent teaches that the limited bandwidth available "within the frequency band of five megahertz to 40 megahertz" poses "a problem with using the cable plant to carry telephonic signals." To solve this problem, the '678 approach is that "currently existing frequency allocations for cable television are redefined." That is to say, the division between high and low bands in a CATV network is moved from about 40 MHz to several hundred megahertz higher. This simplistic approach is highly disadvantageous because it requires replacement of substantial amounts of equipment in any CATS network. Such an expensive approach has not yet been adopted for actual use.

U.S. Pat. No. 5,638,422, like the previously mentioned documents, teaches carrying uplink cellular communications in "the return path of the CATV system, i.e. 5 to 30 MHz, for telephone traffic in the return direction." Furthermore, downlink cellular communications are disadvantageously carried in "the forward spectrum, i.e. 50 to 550 MHz of the CATS system". This interferes with CATV signals, and is problematic for the CATV operator, who must move existing programming to other parts of the spectrum to make room for downlink cellular signals.

U.S. Pat. No. 6,223,021 teaches how to use programmable remote antenna drivers to provide augmented cellular coverage in outdoor areas. For example, during morning rush hour, the remote antennas are tuned to one frequency set and to another during evening rush hour. Thus, outdoor communications can be flexibly augmented. The remote antenna drivers and their antennas are hung from outdoor CATV cables. The '021 patent does not describe how to solve the problem of limited upstream bandwidth for uplink cellular communications.

U.S. Pat. No. 6,192,216 describes how to use a gain tone from remote antenna locations, sent over a CATV network, to determine a proper level of signal at which each remote antenna location should transmit.

U.S. Pat. No. 6,122,529 describes the use of outdoor remote antennas and remote antenna drivers to augment an existing cellular coverage area, but only in areas where outdoor cellular antennas provide no coverage. The signal of a given BTS sent to a cellular antenna tower is simulcast over the remote antennas to overcome "blind" areas.

U.S. Pat. No. 5,953,670 describes how to use remote antenna drivers as well, but adopts the above-identified approach of sending uplink cellular communications in the low CATV band.

SUMMARY OF THE INVENTION

It is therefore an object to overcome the above-identified limitations of the present mobile radio networks, and the above-identified disadvantages of the related attempts to integrate standard mobile radio networks with CATV networks.

According to one aspect of the system, there is provided an extension to conventional mobile radio networks whereby a CATV network is enabled to transport multi-band bidirectional mobile radio traffic. According to another aspect of the system, there is provided a CATV network capable of handling traffic in a pre-determined multi-band configuration of various mobile radio systems from various providers, simultaneously, without degrading the CATV services or the cellular services.

To achieve the above and other objects, the CATV network functions as an access element of the mobile radio networks, namely in the RF propagation-radiation section. According to the system described herein, the capabilities of existing CATV networks are substantially preserved, and the mobile radio terminals do not have to be modified. That is to say, the signals sent according to the radio communications protocol traverse the CATV network on non-utilized CATV frequencies above the frequencies used for CATV programming, but teach the mobile terminals exactly at the same standard frequency as was originally produced by the base station.

The radio frequencies and channel structures of the mobile radio networks and CATV networks are different. The CATV network is modified so as to permit the propagation of the RF signals of the mobile radio network, frequency translated to propagate over the CATV system in a band higher than the CATV programming.

Such a frequency band is not used at all by the CATV operators, but it may be used to carry combinations of cellular systems signals by properly upgrading the CATS infrastructure. Thus, it is an objective to provide a system capable of transporting more than one cellular system simultaneously (in other words, multi-band cellular service).

A conventional CATV network is a two-way network having a tree and branch topology with cables, amplifiers, signal splitters/combiners and filters. According to one aspect of the system, the cables and other passive components like signal splitters/combiners are not modified, but the active elements are. Thus, the system includes new components for a CATV system that permit to overlaying a multi-band, multi-standard, bidirectional communication system. The modified components allow both types of signals (the CATV up and down signals and the cellular up and down signals) to be carried by the network simultaneously in a totally independent manner (without any cross-coupling which can be a source of an unacceptable interference).

It is important to note that the cables (fiber and coaxial) used in CATV networks are not severely limited as to bandwidth. Practical CATV networks are bandwidth limited by the bandwidth and signal loading limitations of practical repeater amplifiers. CATV networks now use filters to segment cable spectrum into two bands—one for upstream communications and the other for downstream communications. By adding duplexers and filters to provide additional spectrum segmentation it allows additional amplifiers to handle upstream and downstream cellular network traffic.

According to another aspect of the system, there is provided a component that acts as a transmit/receive antenna and frequency translator for any combination of cellular signals, and as a CATV input/output unit for the CATV network. The component may also provide controlled attenuation in the downlink. Most of the existing CATV video signals are already limited to frequencies under 750 MHz (some CATV networks go up to 860 MHz) so the standardized cellular signals are translated to above this limit. The different types of signals (CATV & Cellular) can coexist within the same CATV cable due to this fact.

The CATV network is thus modified in a way that permits the CATV transmissions to be maintained in their original format and frequency assignments. The modifications to the CATV network itself can be made using only linear components such as filters and amplifiers. The modifications are simple, robust and affordable.

The invention is taught below by way of various specific exemplary embodiments explained in detail, and illustrated in the enclosed drawing figures. It will be appreciated, however, that the invention is much broader than the examples described below, and the examples are provided for the sake of teaching the invention in its presently preferred embodiment. The appended claims are intended to describe the actual scope of the invention.

BRIEF DESCRIPTION OF THE DRAWING FIGURES

The drawing figures depict, in highly simplified schematic form, embodiments reflecting the principles of the invention. Many items and details that will be readily understood by one familiar with this field have been omitted so as to avoid obscuring the invention. In the drawings:

FIG. 1 shows a conventional CATV network.

FIG. 2 exemplifies prior approaches to carrying cellular signals over a CATV network.

DETAILED DESCRIPTION OF THE PREFERRED EMBODIMENTS.

The invention will now be taught using various exemplary embodiments. Although the embodiments are described in detail, it will be appreciated that the invention is not limited to just these embodiments, but has a scope that is significantly broader. The appended claims should be consulted to determine the true scope of the invention.

Figure 1:
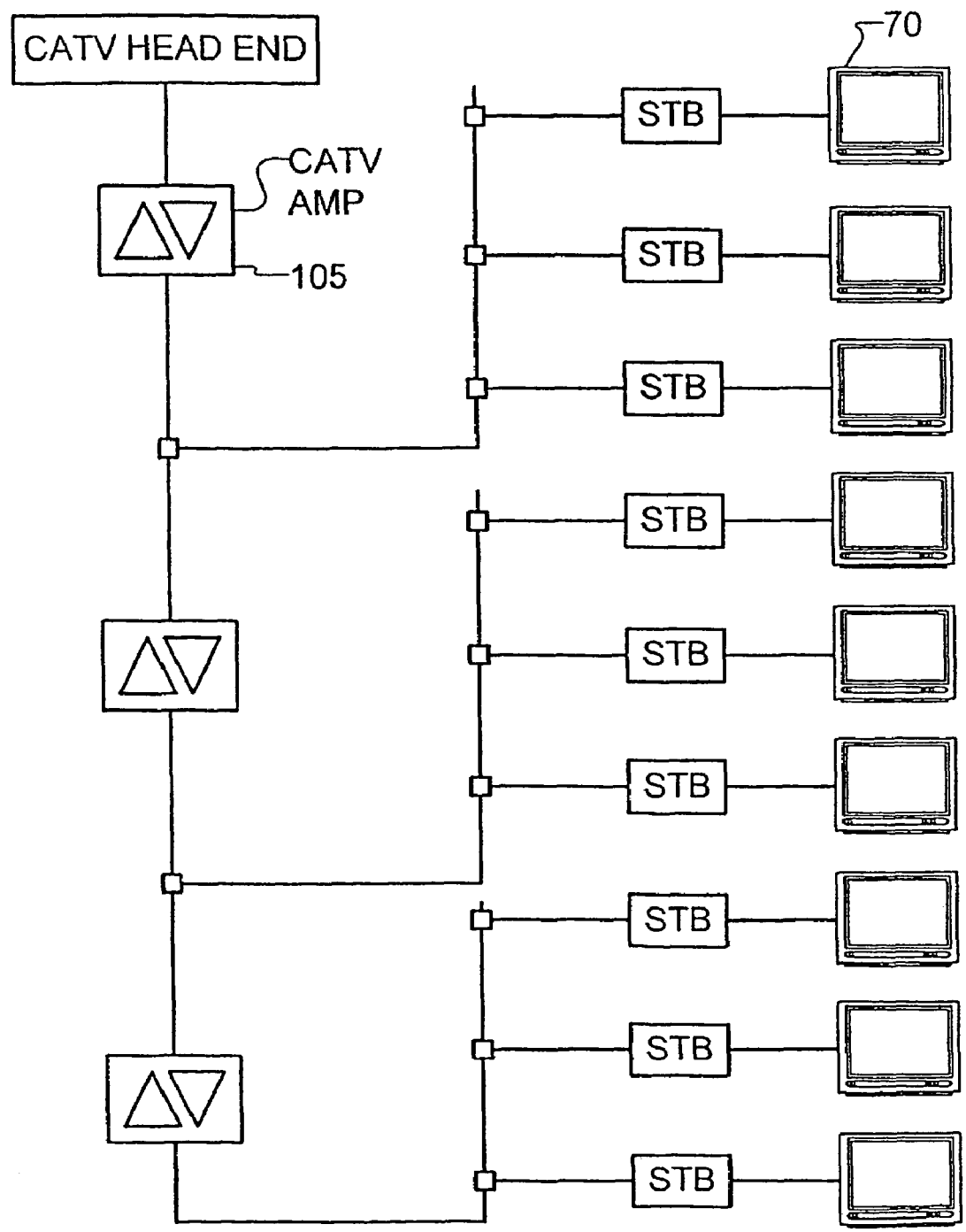
Figure 2:
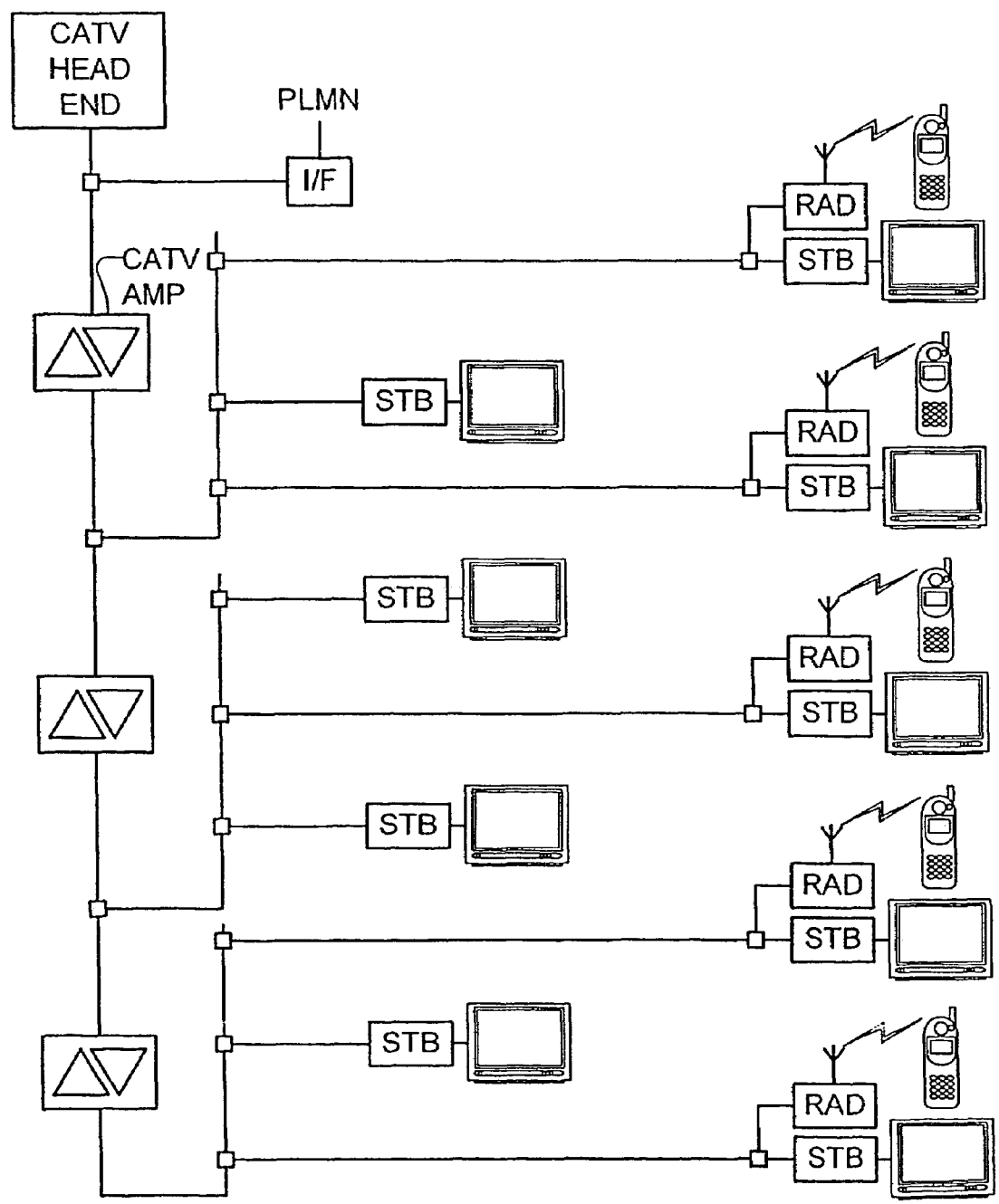
Figure 3:
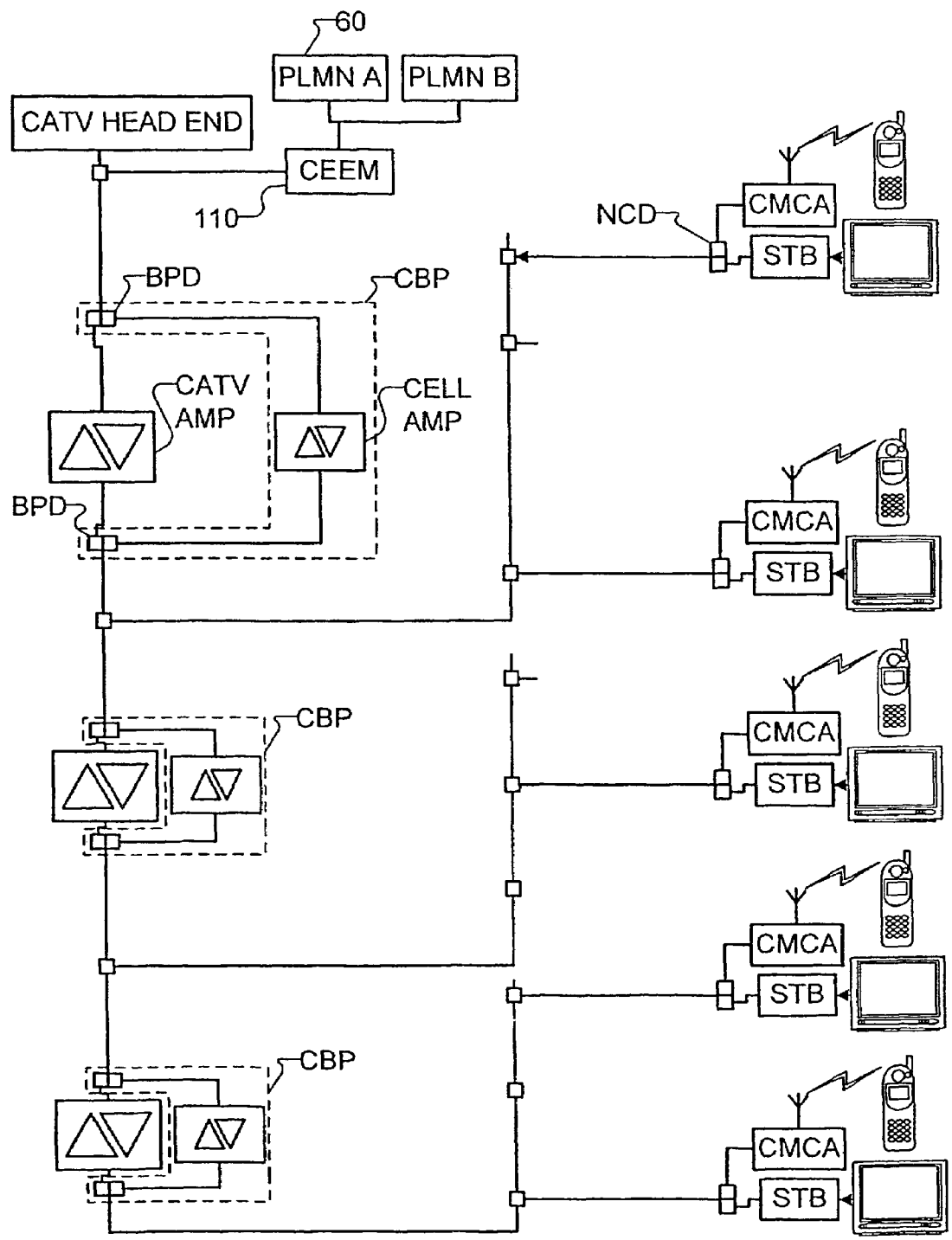
FIG. 3 shows an upgraded cellular cable network according to one embodiment of the invention.

FIG. 3 shows a CATV segment in a hybrid wireless/CATV system in which the invention is implemented. In FIG. 3, the wireless uplink and downlink frequencies are not converted into the normal bandwidth of the CATV system. Instead, the uplink and downlink frequencies are converted into a part of the bandwidth above the CATV programming. That is to say, wireless communications are all carried above, for example, 860 MHz.

The CATV amplifier normally passes along only frequencies in the 5-45 MHz band for upstream communications, and filters out all other frequencies passing upstream. The CATV amplifier normally passes along only frequencies in the 50-750/860 MHz band for downstream communications, and filters out all other frequencies passing downstream. This poses a problem for carrying the cellular communications in a band above the normal CATV programming.

To overcome this problem, a cellular bypass (CBP) is installed at each active point or component (such as a CATV amplifier, trunk amplifier, line extender, distribution module, and the like). The CBP includes a cellular amplifier and bypass devices (BPD). The CBP thus passes the uplink and downlink communications around the CATV amplifiers so that the cellular communications are not filtered out by the CATV amplifiers.

At each end user location, there is provided a network coupling device (NCD) and a cable mount cellular antenna (CMCA). The NCD passes CATV traffic to and from the STB (or television set or other component, if no STB is used), and passes cellular traffic to and from the CMCA. The end user location may be thought of as an indoor termination point of the CATV network.

The traffic from the head end is combined with traffic from PLMN A and PLMN B via a cellular entrance module (CEEM, described below). PLMN A and PLMN B are different types of systems, such as GSM1800 and UMTS. The traffic from these two different systems may be thought of as multi-band traffic or multi-band cellular communications. As used herein, "multi-band" means traffic of more than one system (although such systems might conceivably be of the same type, such as UMTS from one provider and UMTS from another provider).

Figure 4:
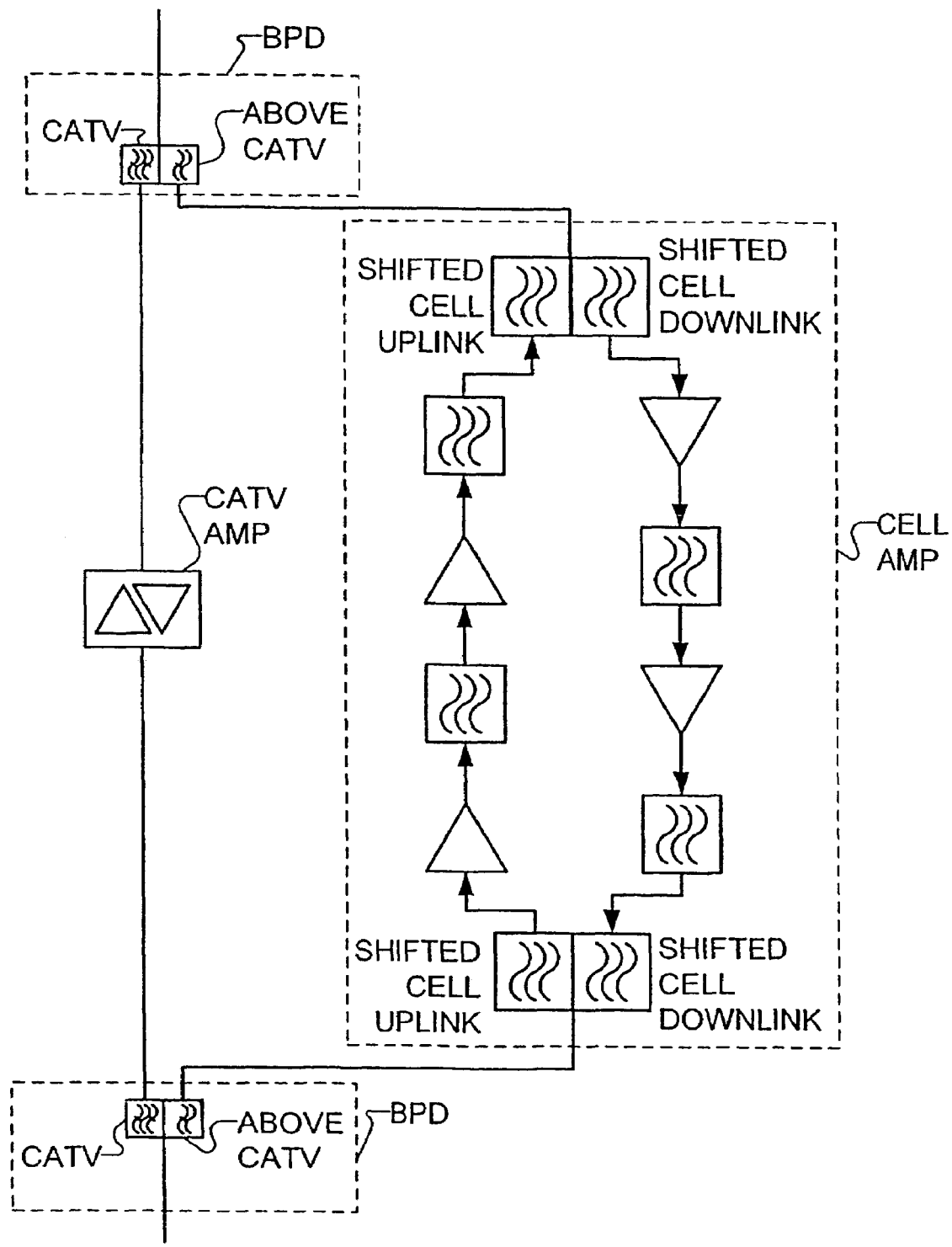
FIG. 4 shows a schematic of a cellular bypass device according to an embodiment of the invention.

FIG. 4 shows a more detailed view of the cellular bypass (CBP). Each bypass device BPD includes filters that pass the CATV traffic (5-750/860 MHz) to the CATV amplifier, and that pass the cellular traffic to the cellular amp. The cellular uplink and downlink traffic is not at the normal cellular frequencies, but is shifted to another frequency band that is typically lower than the normal transmission frequencies, but higher than the CATV programming. As shown in FIG. 4, the shifted uplink and downlink traffic is amplified and then rejoined to the cable at the other bypass device BPD.

The CBP may also be referred to as a cellular transport module (CETM) because it transports the cellular signal through the CATV network. The CETM is installed at any active component of the CATV network, bypassing the trunk amplifiers, line extenders and distribution modules. The CETM in FIG. 4 is thus a bi-directional amplifier repeater that amplifies the shifted up-link and shifted downlink cellular signals. It may also amplify LO (local oscillation) carriers (described below). The bi-directional amplification of the shifted cellular signals is done at each point on the CATV network where a CATV amplifier is installed, since the standard CATV amplifier cannot handle the shifted cellular uplink and shifted downlink signals as is. The CETM repeater should be linear enough, in order to prevent distortion of the cellular signals. Its gain should not vary too much across the 75 MHz band in each direction. The CETM may get its energy from the CATV network, in which case it should be very efficient with minimal power supply.

According to a specific embodiment, the CETM may be installed even when an active component like a CATV amplifier is not present. That is, the CETM may be employed in situations in which only the cellular signals need to be amplified.

Figure 5:
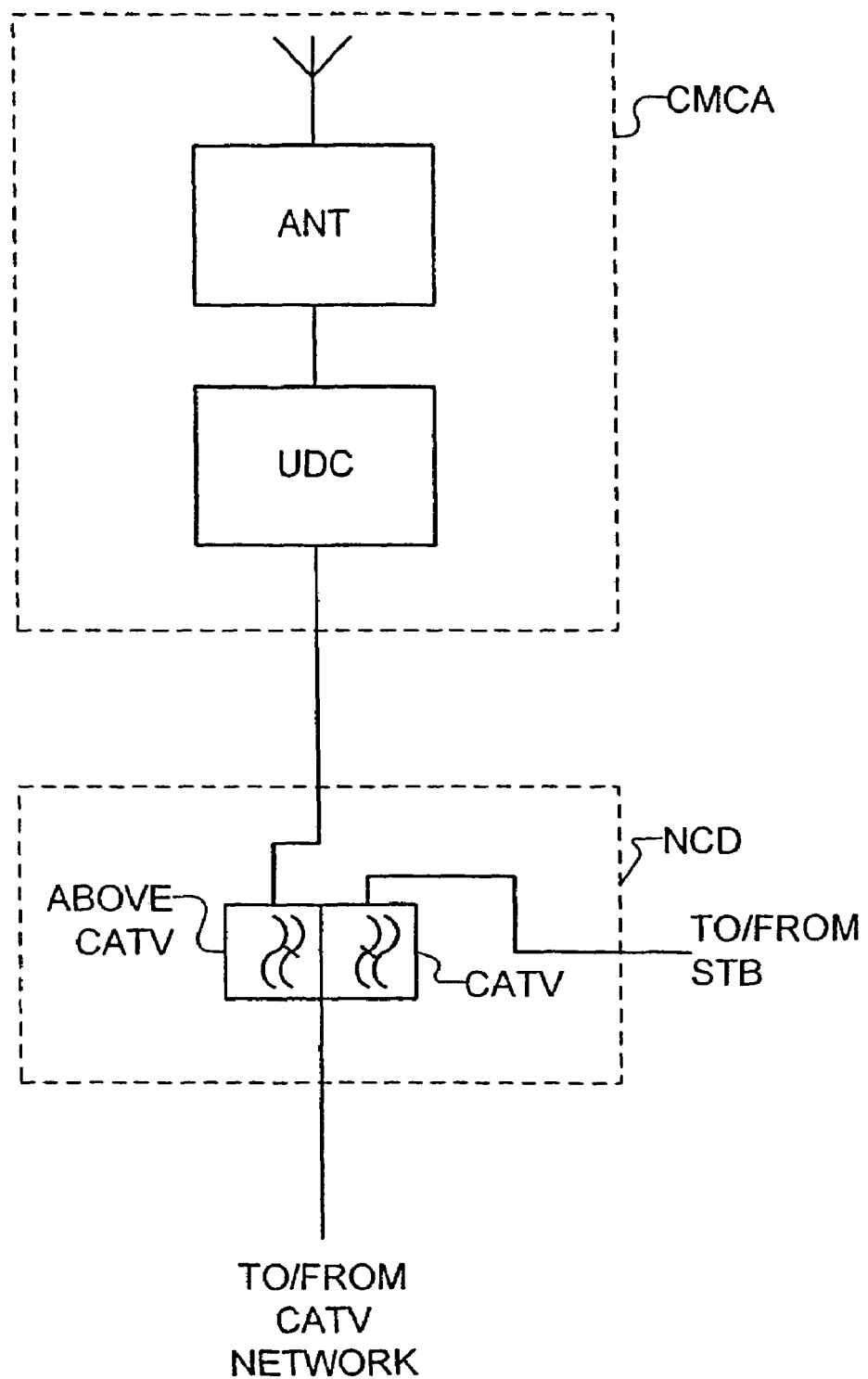
FIG. 5 shows a network coupling device and a cable mount cellular antenna according to an embodiment of the invention.

FIG. 5 shows the network coupling device NCD and the cable mount cellular antenna CMCA. The NCD simply passes the CATV traffic (860 MHz and below, for example) to the set-top box STB, and passes the cellular traffic (above 860 MHz, for example) to the CMCA. The CATV and cellular signals, when together, may be thought of as a combined signal.

The CMCA includes an up and down converter UDC for converting the cellular frequencies from the shifted frequencies to the normal frequencies according to the particular standard or standards being used for cellular communications. Likewise, the UDC also takes normal cell frequencies and converts them to shifted frequencies for transmission along the cable. The UDC may also be referred to, more simply, as a frequency converter.

The CMCA, in particular, takes downlink communications and converts them from their shifted form, as received from the cable system, to their normal unshifted frequencies. Also, it takes uplink communications and converts them from their normal unshifted frequencies, to shifted frequencies for transmission along the cable system to the appropriate PLMN.

The up and down converter UDC is coupled with an antenna for communicating with a mobile terminal at the normal cellular frequencies.

The UDC may include more than just one frequency converter module, and might have several.

Figure 6:
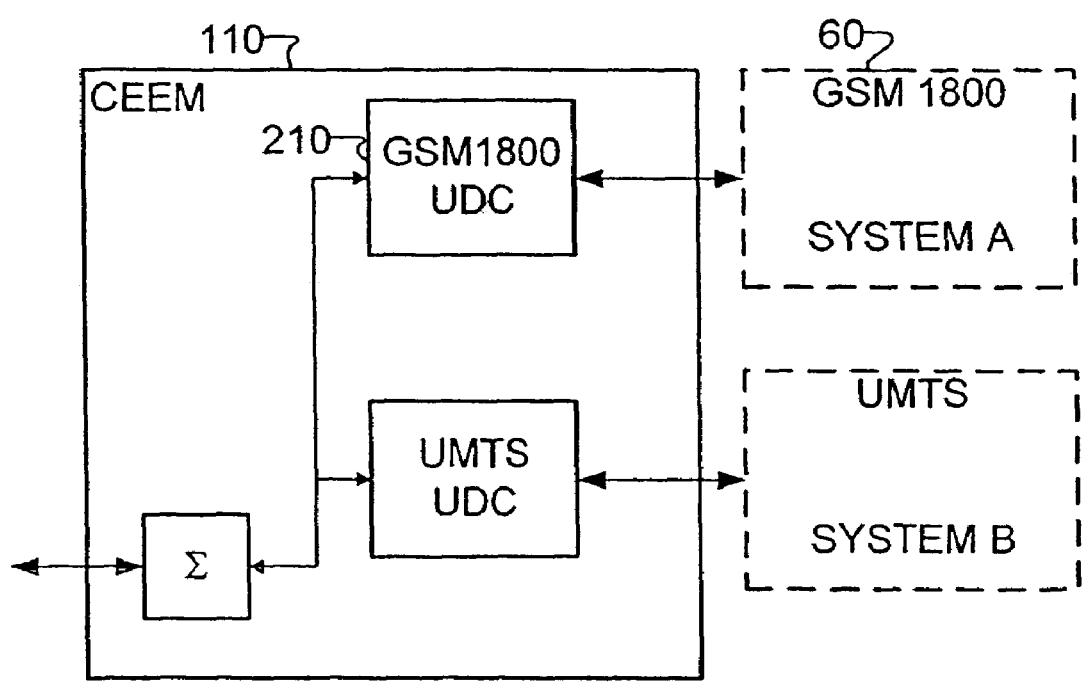
FIG. 6 shows a cellular entrance module for a dual band system according to an embodiment of the invention.

FIG. 6 shows a cellular entrance module (CEEM) 110. A BTS 60 from cellular system A and a BTS from cellular system B are each connected to the CEEM. System A is a GSM1800 system in this example, and system B is a UMTS system. The two systems A and B may be from the same or different providers.

Figure 7:
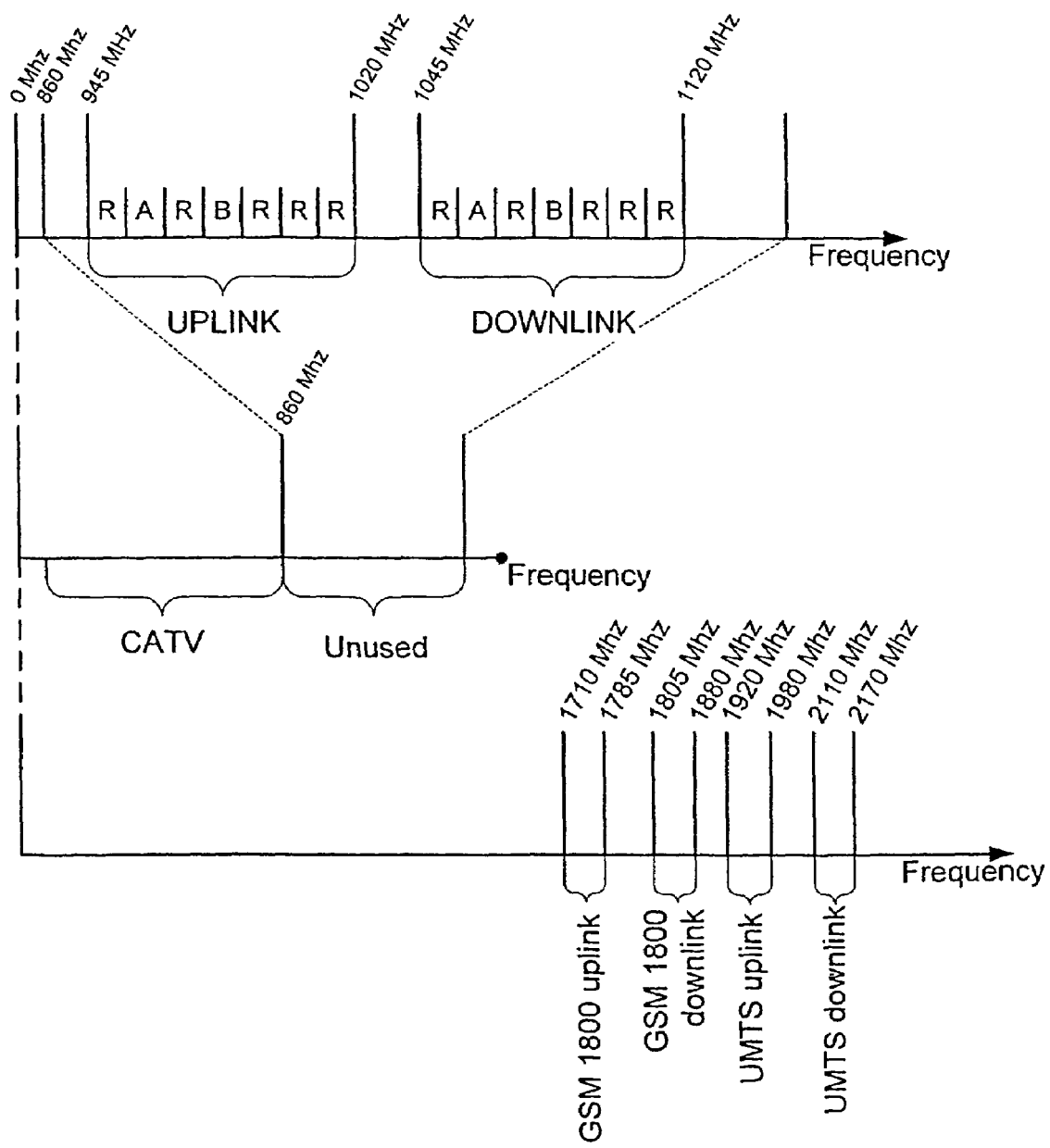
FIG. 7 shows one frequency assignment scheme for a dual band cellular system.

FIG. 7 shows how these two systems can both be accommodated at the same time in the bandwidth of the CATV system.

FIG. 7 shows, as an example, the UMTS (for system B) and GSM1800 (for system A) frequencies before and after the frequency conversion. That is to say, the GSM 1800 system (system A) is frequency translated so that the uplink traffic occupies the part of the shifted uplink signals (UPLINK in the upper part of the figure) indicated by A. This GSM 1800 system (A) is also frequency translated so that the downlink traffic occupies the part of the shifted downlink signals (DOWNLINK in the upper part of the figure) as indicated also by A.

Likewise, the exemplary figure shows how the signals of UMTS system B are frequency translated into the shifted uplink signals and the shifted downlink signals that are carried over the unused frequencies of the CATV system. In the figure, the symbol "R" indicates a reserved sub-band, which may be used for any particular purpose. Each part of the uplink band and the downlink band is thus referred to herein as a sub-band.

Figure 8:
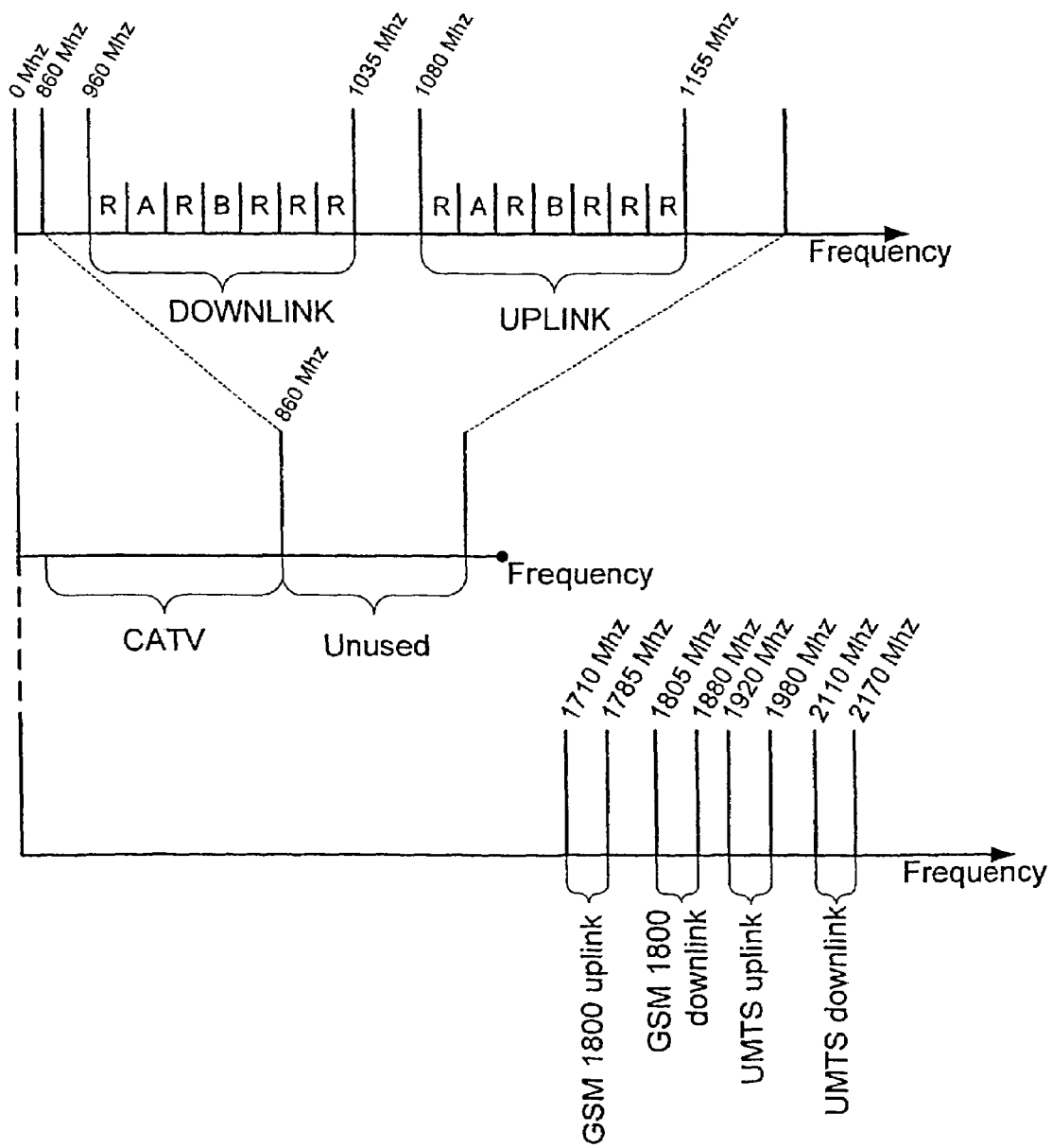
FIG. 8 shows an alternative frequency assignment scheme for a dual band cellular system.

FIG. 8 shows an alternative frequency shifting approach to illustrate the fact that many variations are possible within the invention, and that the method described herein is very flexible. In particular, in FIG. 8, the shifted cellular downlink signals are carried in the range of, e.g., 960 MHz to 1035 MHz, and the shifted uplink signals are carried in the range of, e.g., 1080 MHz to 1155 MHz.

The location of the uplink and downlink bands can be varied to suit the preferences of the local CATV provider, to provide sufficient isolation between the shifted cellular signals and the CATV signals, and to provide sufficient isolation between the shifted uplink and the shifted downlink cellular signals.

The widths of the uplink and downlink bands may also be varied, and also the widths of the sub-band's may likewise be varied and need not necessarily be uniform in width.

Returning to FIG. 6, the BTS 60 from GSM1800 system A is connected to an up/down frequency converter 210 which converts downlink GSM1800 signals from their original unshifted cellular format to a shifted format in accordance with the predetermined frequency shifting approach or plan (such as those in FIG. 7 or 8). The downlink signals from system A are thus shifted to the part of the downlink band set aside for system A.

The BTS 60 from UMTS system B is connected to a frequency converter 210 which converts downlink signals from their original unshifted cellular format to a shifted format in accordance with the predetermined frequency plan. The downlink signals from system B are thus shifted to the part of the downlink band set aside for system B.

Likewise, the frequency converters 210 convert the shifted cellular uplink signals from the shifted format (i.e., from the frequencies in the uplink bands set aside for the particular systems) to their normal format (i.e., into GSM 1800 or UMTS frequencies).

It will be appreciated that the CEEM receives original cellular signals from a plurality of base stations, and converts the original cellular signals to a shifted format in a sub-band in accordance with a predetermined frequency shifting plan, and passes the shifted downlink signals to a CATV system. Similarly, the CEEM receives shifted cellular signals from the CATV system, and converts the shifted cellular signals to an original format in accordance with the predetermined frequency shifting plan, so as to output original cellular signals to respective ones of the base stations.

The base stations participate in different respective cellular systems (i.e., a GSM 1800 system for system A, and a UMTS system for system B), and the sub-bands may thus each carry the traffic for a different service provider and/or a different system.

Each up-link or downlink sub-band may be translated independently by using a different local oscillator in the respective UDC 210 of the CEEM. Guard bands between the sub-bands are not shown in the figure for the sake of simplicity. However, if guard bands are needed between the sub-bands, the local oscillator frequencies can be set so as to create them.

The sub-bands are created out of the original standard frequency allocation of mobile radio systems. The bandwidth of the sub-band to be translated is not limited by the examples shown herein. The mobile radio system provider may offer to transport up to all the bandwidth he owns by this system.

Figure 9:
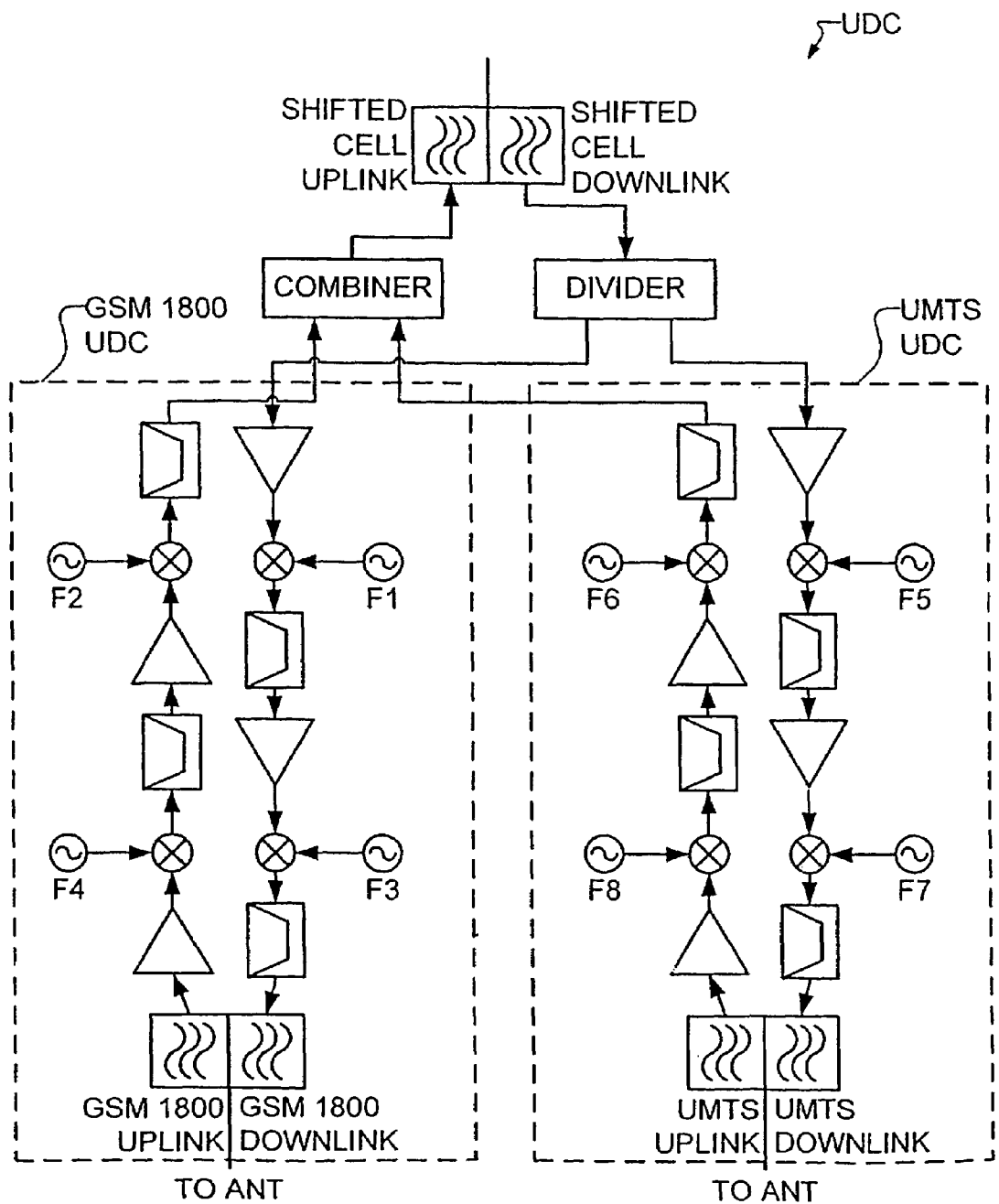
FIG. 9 shows a frequency converter (UP/Down converter, or UDC) for a dual band cellular system with frequencies as in FIG. 7 or 8.

FIG. 9 shows a frequency converter UDC for a CMCA in accordance with the system in FIGS. 6 and 7 or 8. In particular, the UDC is adapted for a situation in which a GSM provider and a UMTS provider are accommodated at the same time over the cable system. The shifted cellular signals are communicated as shown at the top of the figure via a combiner (for the uplink signals) and a divider (for the downlink signals).

The downlink signals are converted in a known manner to an intermediate frequency (with local oscillators F1/F5), and then converted to the normal cellular frequencies for GSM and UMTS, respectively (using F3/F7). These are passed on to the antenna unit ANT.

Likewise, the uplink signals are received from the antenna unit ANT and converted in the known manner (using F4/F8) to an intermediate frequency, and then converted (using F2/F6) to the shifted cellular frequencies and combined for carrying over the CATV network.

Because the CMCA in this example handles two different systems, it may be thought of as a cable mount dual band module (CMDBM). Also, because the CMCA in this example handles 3G type traffic, it may be described as a cable mount third generation module (CMTGM). Both manners of description are appropriate, although the more generic term CMCA will be used throughout this description because the delivery of signals from an arbitrary number of systems and of any wireless type is an important objective.

As can be understood from the foregoing, precise Local Oscillators (LO) are needed. The local oscillator frequencies can be injected to the system at the CEEM, and carried along the path to the CMCA. Such LO frequencies may be referred to as pilot tones. The CMCA can use this LO signal to convert the cellular up and down link signals to/from their original standard frequencies. Transporting the local oscillator frequencies along the network to the CMCA eliminates the need for using precise and expensive frequency sources in the CMCA. This can reduce the complexity and cost of the CMCA for the subscriber. Of course, this method of transporting the LO frequencies is preferred but not required, and precise local oscillators may be provided in the CMCA.

Some service providers might want to supply only single band service to some of their customers. A single band module can co-exist with other dual- or triple-band (or greater) modules connected to the same multi-band upgraded CATV network. The same premises may have a single band module in one CATV outlet, and a dual-band module in a different CATV outlet, elsewhere in the house or office.

FIG. 9 shows a UDC arranged for use in a CMCA, but it will be readily apparent to those familiar with this field that a substantially similar arrangement could be used as the UDC in the CEEM shown, for example, in FIG. 6, but with the uplink and downlink paths in the appropriate directions.

FIG. 9 shows a frequency converter UDC adapted for handling two systems (and thus having two frequency converter modules), but the same approach could be taken for handling any arbitrary number of systems. Likewise, performing the intermediate frequency conversion could be performed even if only one system was being supported.

An example with three systems will now be presented.

Figure 10:
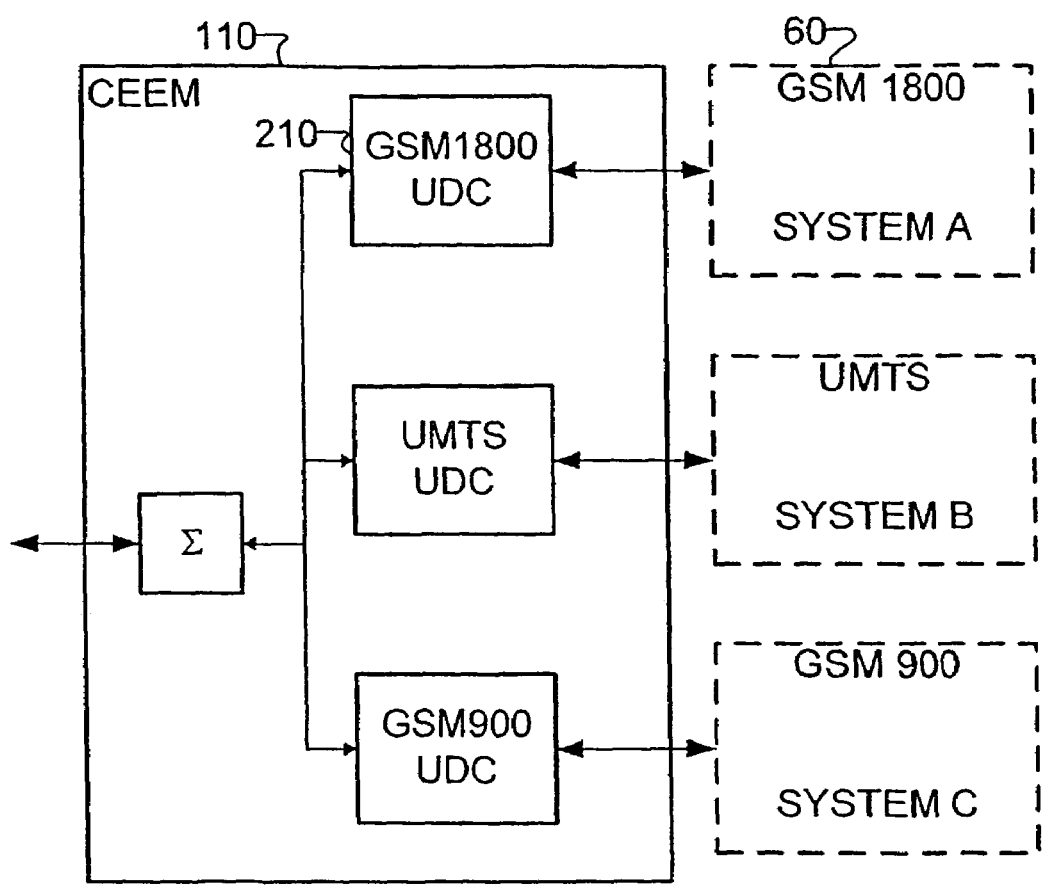
FIG. 10 shows a cellular entrance module for a triple band system according to an embodiment of the invention.

In FIG. 10, systems A and B are as in the previous example, but now an additional system, system C, has been added. System C is a GSM 900 system. The CEEM 110 in FIG. 10 therefore has a third frequency converter 210 to which a BTS for the system C is connected. Downlink signals from the GSM 900 system are shifted by this frequency converter in accordance with the frequency plan shown in FIG. 11.

Figure 11:
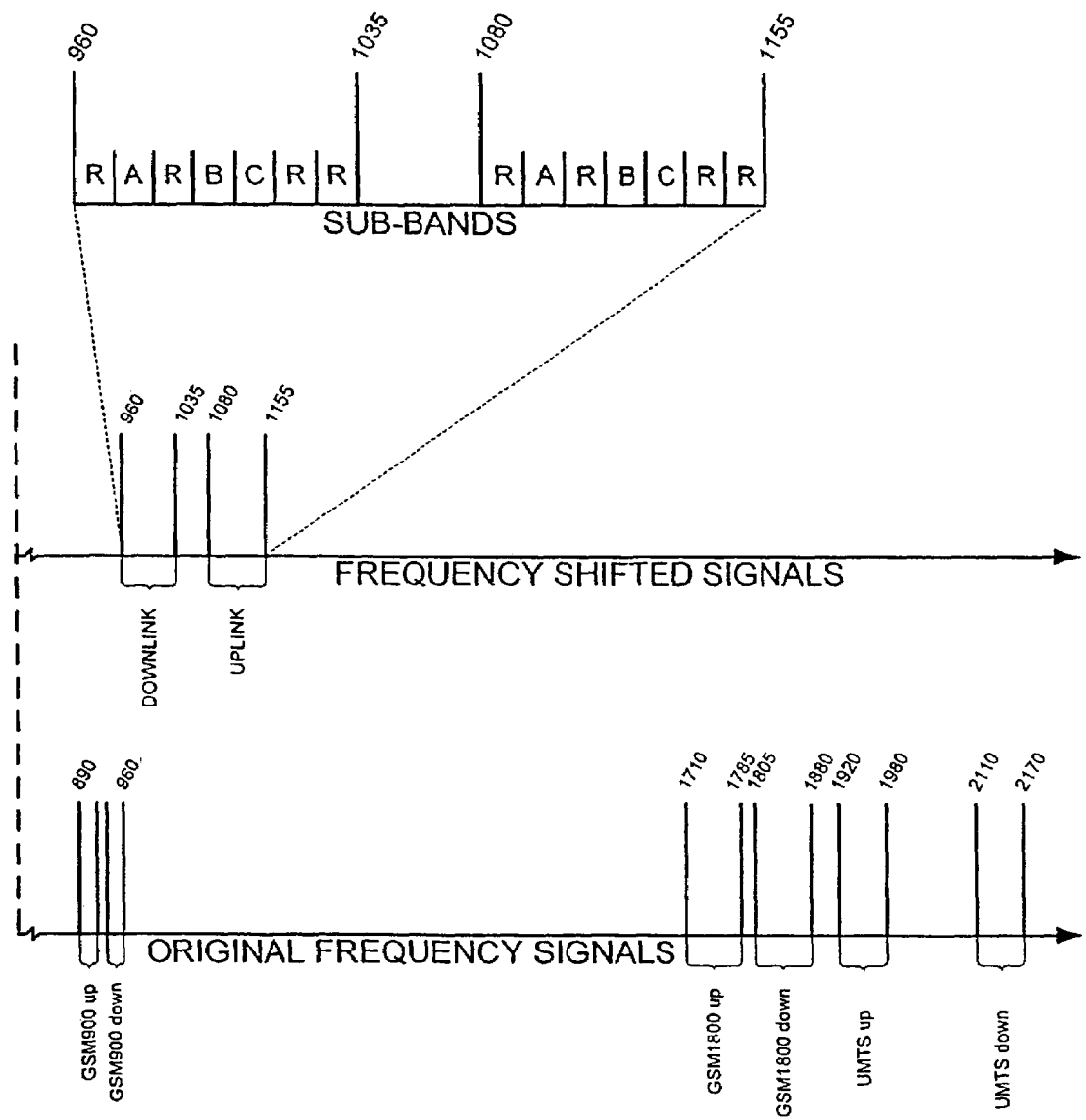
FIG. 11 shows a frequency assignment scheme for a triple band cellular system.

At the bottom, FIG. 11 shows the original, unshifted uplink and downlink bands for the various cellular communications systems being considered here. Above that, FIG. 11 shows the downlink and uplink bands to which the cellular signals are frequency shifted. In the top part of the figure, a more detailed view of the uplink and downlink bands is shown, including the sub-bands.

FIG. 11 is somewhat similar to FIG. 7, and very similar to FIG. 8, except that one of the sub-bands is now dedicated for system C. In this example, the arrangement in which the shifted downlink cellular signals are carried at a frequency below the shifted cellular uplink signals is used, the downlink band being between 960 and 1035 MHz, and the uplink band being between 1080 and 1155 MHz.

Figure 12:
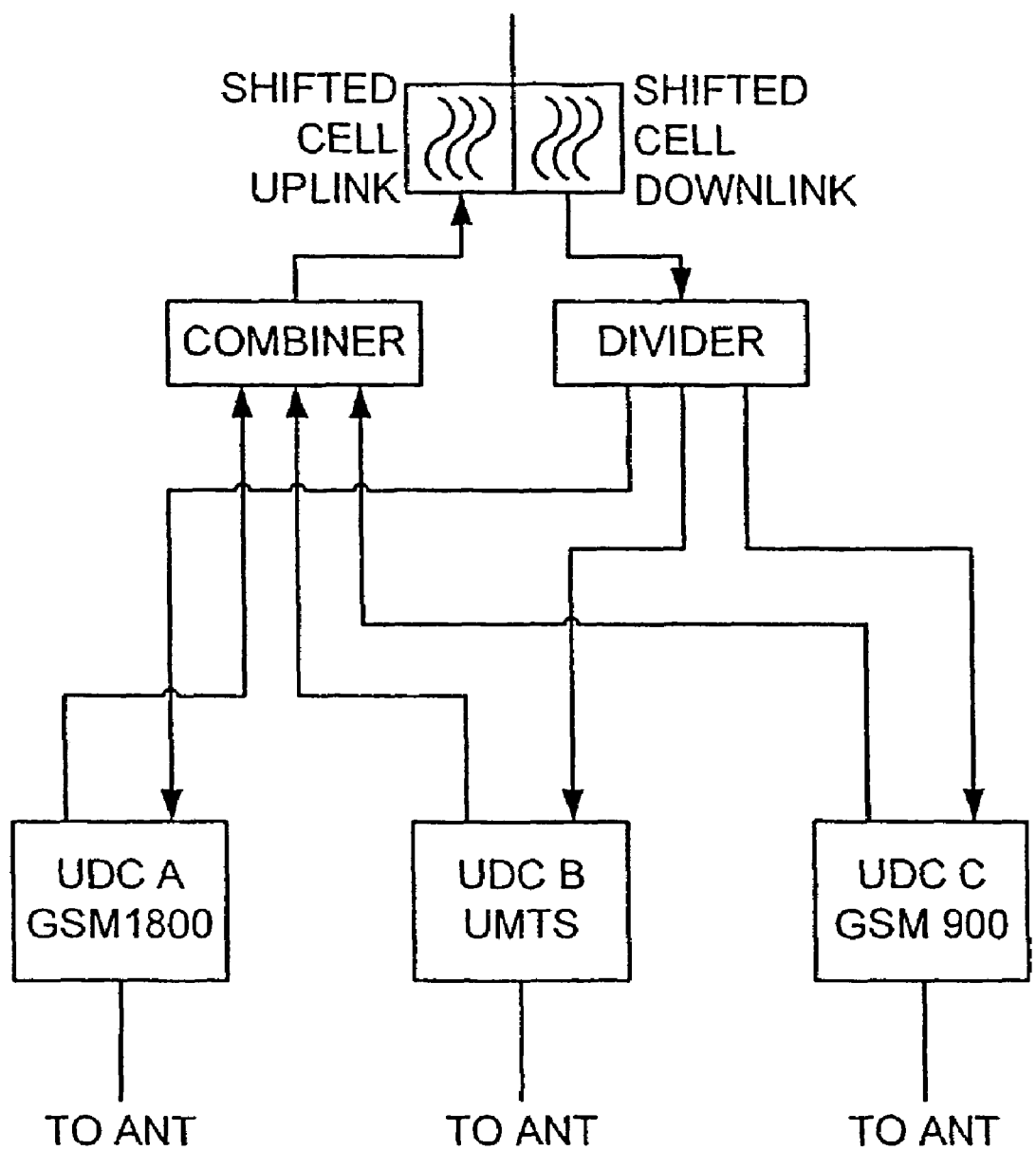
FIG. 12 shows a frequency converter for a triple band cellular system.

FIG. 12 shows a CMCA suitable for use in this example. That is to say, the CMCA has a UDC with three different UDC modules, one for each of the different cellular systems. In particular, UDC module A is a converter for GSM 1800 signals, UDC module B is a converter for UMTS cellular signals, and UDC module C is a converter for GSM 900 cellular signals. Each of these modules converts the original, unshifted uplink cellular signals to the appropriate sub band, and vice versa.

Now, an example will be provided in which there are six different base stations connected to a CEEM.

Figure 13:
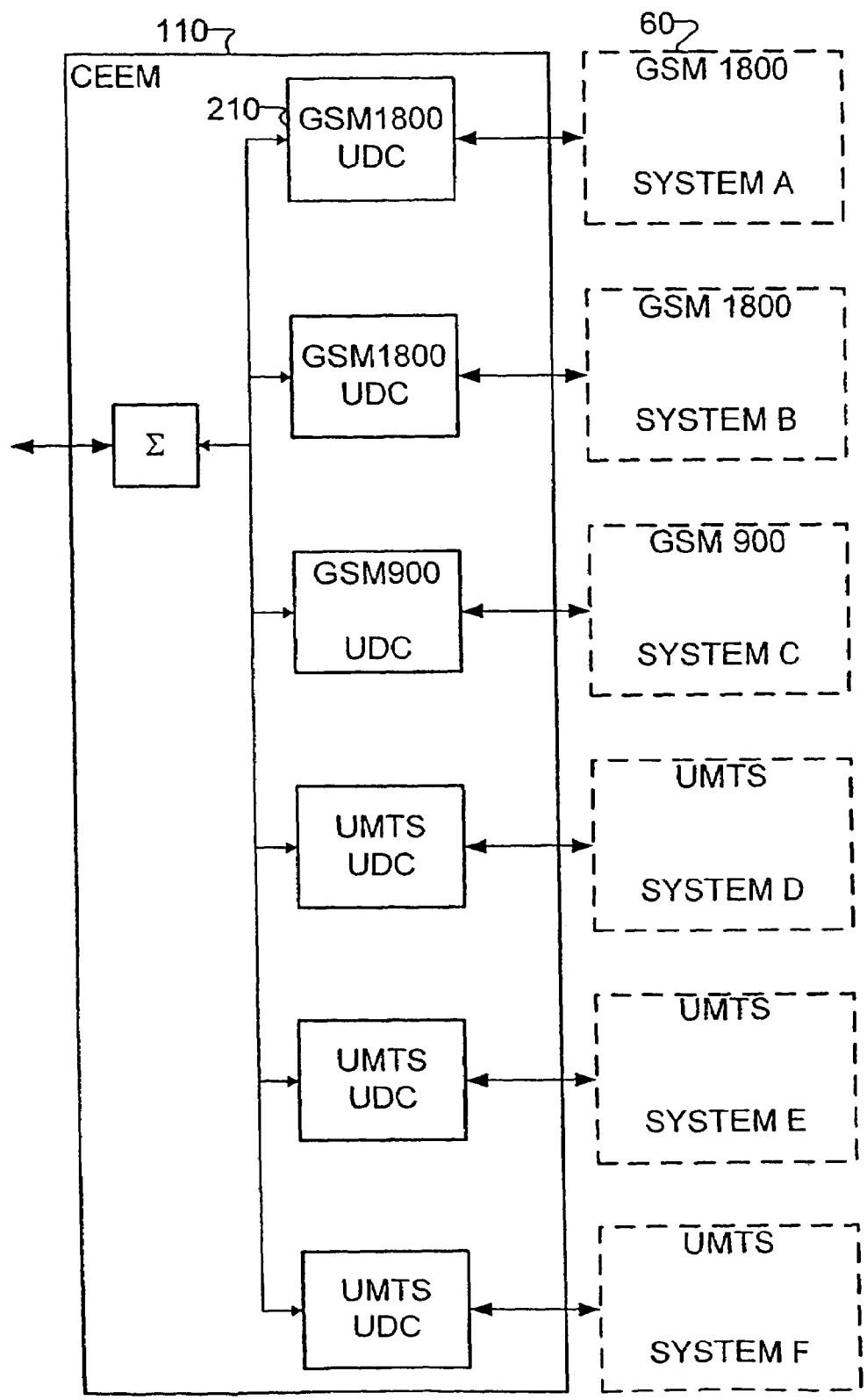
FIG. 13 shows a cellular entrance module for a six band system according to an embodiment of the invention.
Figure 14:
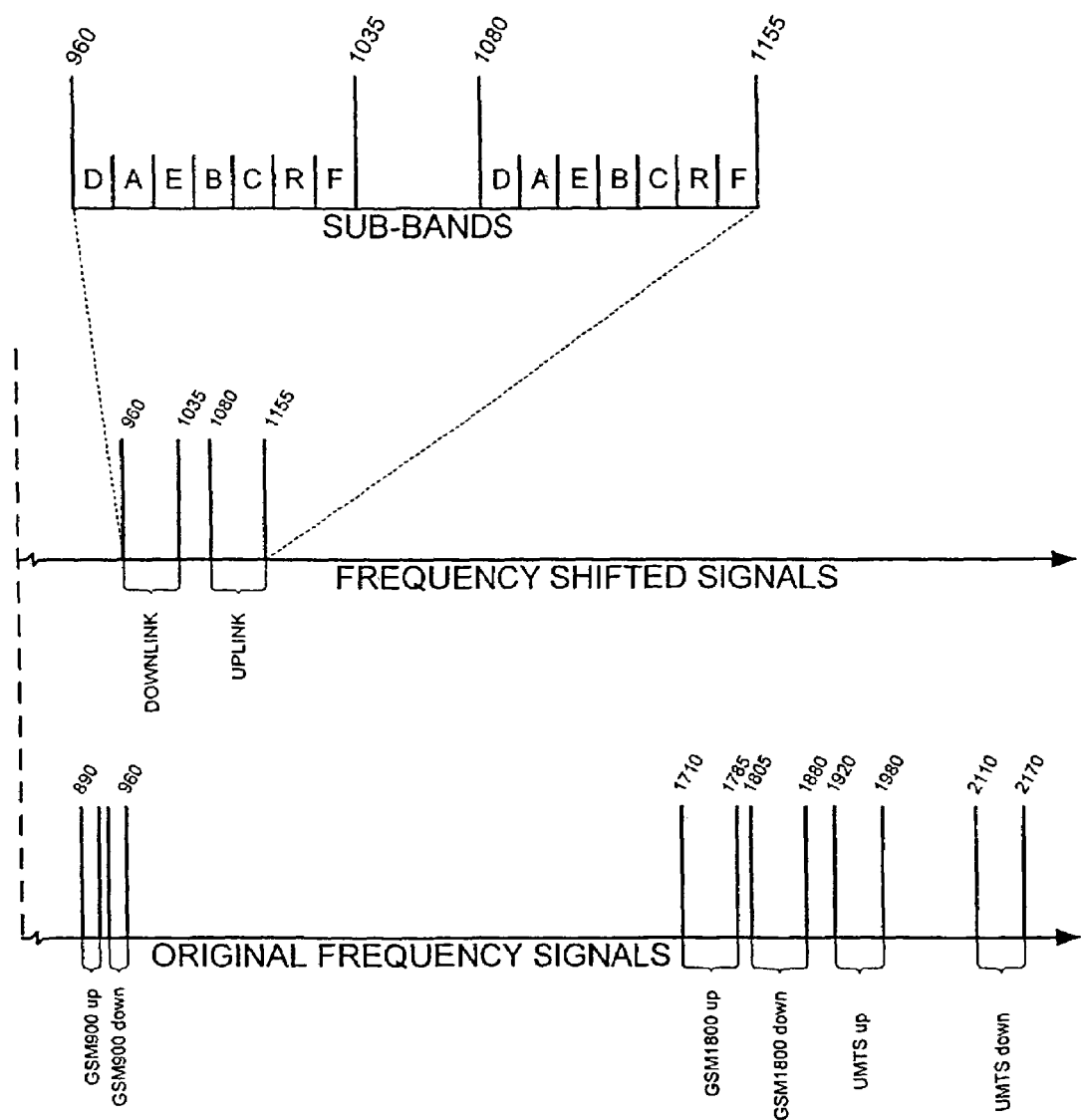
FIG. 14 shows a frequency assignment scheme for a six band cellular system.
Figure 15:
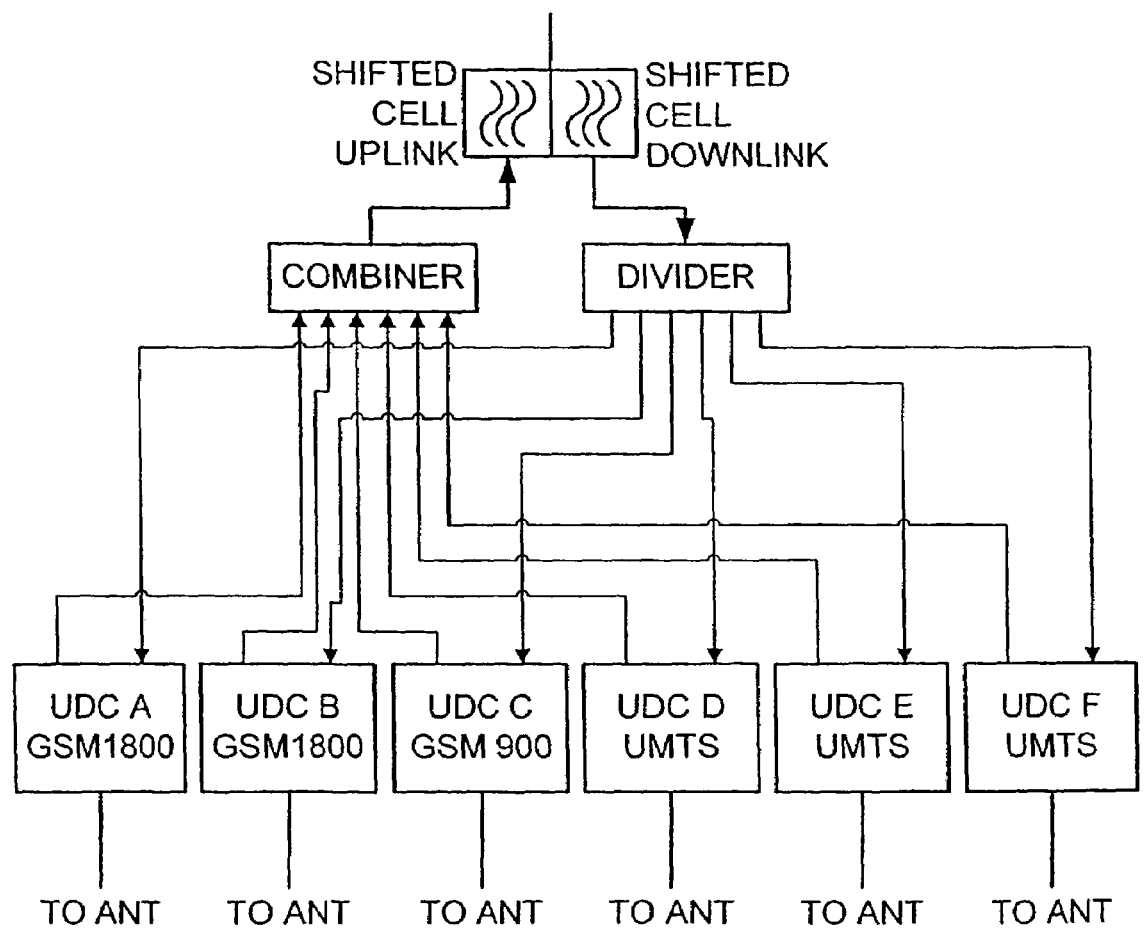
FIG. 15 shows a frequency converter for a six band system.

In FIG. 13, six different cellular systems are represented. Systems A and B are GSM 1800 systems. System C is a GSM 900 system. Systems D-F are UMTS systems. Each of these six systems has a BTS 60 connected to the CEM 110. Each is connected to a respective UDC 210. The respective UDC 210 for each BTS performs frequency conversion in accordance with the plan shown in FIG. 14, which shows how the different sub bands have been set aside for the use of each system. FIG. 15 shows a CMCA suitable for use in this example. The CMCA has a UDC with six UDC modules. Each of the six UDC modules is responsible for frequency conversion of the cellular signals between the original unshifted format and the shifted format in accordance with the frequency plan shown in FIG. 14. It will be appreciated that the six systems may be provided from the same or different providers, or combinations of providers.

One familiar with this field will understand that the use of the equipment and method described herein constitutes a method for enhancing the throughput of second and third generation cellular networks. With indoor cells accessed through the cellular CATV network, the power of the transmitting mobile units indoors can be very low. This, coupled with the inherent attenuating effects that occur within buildings, combine to make it possible for a much better data service in indoor cells.

The various embodiments and aspects of the system described herein help overcome the previously described coverage and capacity constraints now faced by operators of cellular mobile radio networks. By mitigating these coverage constrains, the cost of providing excellent radio coverage is reduced and service levels are improved. CATV system operators will have a potential new source of income. New service packages are possible in which CATV and mobile radio terminal service are combined.

Although the invention has been described above using some concrete examples for the sake of explanation, it will be appreciated that these examples and the enclosed figures are not intended to limit the scope of the invention, which is to be determined based on the appended claims. Many minor modifications and changes will occur to those familiar with this field, and may be made without departing from the scope and spirit of the invention.

The invention claimed is:

1. A method for providing multi-band bidirectional wireless RF cellular communication through a CATV network, comprising:
   providing a bypass device bypassing an active component in a CATV network; and
   communicating frequency shifted wireless RF cellular signals and CATV signals, over the CATV network, between an access point of the CATV network and an indoor termination point of the CATV network, wherein the CATV signals are communicated via the active component and the shifted wireless RF cellular signals are communicated via the bypass device;
   wherein the frequency shifted wireless;RF cellular signals comprise multi-band traffic;
   wherein the active component is a CATV amplifier; and
   wherein the frequency shifted wireless RF cellular signals are in a band higher in frequency than the CATV signals of the CATV network.

2. The method according to claim 1, further comprising, at the indoor termination point of the CATV network:
   receiving shifted downlink wireless RF cellular signals from the CATV network;
   converting the shifted downlink RF cellular signals to original frequency downlink wireless RF cellular signals;
   outputting the original frequency downlink wireless RF cellular signals to an antenna;
   receiving original frequency uplink wireless RF signals from the antenna;
   converting the original frequency uplink wireless RF signals to shifted uplink wireless RF signals; and
   outputting the shifted uplink wireless RF signals to the CATV network.

3. The method according to claim 2, further comprising, at the indoor termination point of the CATV network, communicating CATV signals between the CATV network and at least one CATV device by coaxial cable.

4. The method according to claim 3, wherein the at least one CATV device is one or more of a TV, a set top box, and a cable modem.

5. The method according to claim 2, further comprising communicating the original frequency wireless RF signals over a common air interface of the cellular network.

6. The method according to claim 5, wherein the shifted uplink wireless RF signals have a frequency above 905 MHz.

7. The method according to claim 5, wherein the shifted downlink wireless RF signals have a frequency above 905 MHz.

8. The method according to claim 5, wherein the original frequency wireless RF signals are shifted to a band higher in frequency than the CATV signals.

9. The method according to claim 8, wherein the band is 945-1120 MHz.

10. The method according to claim 8, wherein the band is 960-1155 MHz.

11. The method according to any one of claims 1-10, further comprising, at the access point of the CATV network:
    receiving shifted uplink wireless RF cellular signals from the CATV network;
    converting the shifted uplink RF cellular signals to original frequency uplink wireless RF cellular signals;
    outputting the original frequency uplink wireless RF cellular signals to a BTS;
    receiving original frequency downlink wireless RF signals from the BTS;
    converting the original frequency downlink wireless RF signals to shifted downlink wireless RF signals; and
    outputting the shifted downlink wireless RF signals to the CATV network.

12. The method as set forth in claim 11, wherein the bypass device performs the steps of:
    receiving, as a coupled signal, the CATV signals and the frequency shifted wireless RF cellular signals;
    differentiating between the CATV signals of the coupled signal and the frequency shifted wireless RF cellular signals of the coupled signal;
    passing the CATV signals of the coupled signal through the active component of the CATV network;
    passing only the frequency shifted wireless RF cellular signals of the coupled signal around the active component of the CATV network; and
    after the passing steps, recombining the CATV signals with the frequency shifted wireless RF cellular signals to provide a signal for further communication over the CATV network.

13. The method as set forth in claim 11, further comprising:
    injecting, at the access point of the CATV network, one or more pilot continuous wave (CW) frequencies for communication to the indoor termination point; and performing reverse frequency translation at the indoor termination point using the one or more pilot CW frequencies, to convert the shifted downlink RF cellular signals and to convert the original frequency uplink wireless RF signals.

14. The method as set forth in claim 13, wherein the bypass device amplifies the one or more pilot CW frequencies in only the direction from the access point toward the indoor termination point.

15. A system for simultaneously communicating multi-band bidirectional cellular traffic over a cable television (CATV) network, comprising:
a cellular entrance module (CEEM) at an access point of the CATV network, receiving original downlink signals, including downlink signals from a plurality of base transceiver stations (BTS), and shifting the original downlink signals to a frequency band higher than television signals of the CATV network to provide shifted cellular signals, including at least shifted first downlink signals of a first BTS and shifted second downlink signals of a second BTS, the CEEM having a frequency converter for each BTS providing frequency conversion in accordance with a predetermined frequency plan into predetermined sub-bands of said frequency band;
a cable mount cellular antenna (CMCA) at an indoor termination point of the CATV network, adapted to receive original uplink signals, including original first uplink signals and original second uplink signals, and shifting the original uplink signals to a frequency band higher than television signals of the CATV network to provide shifted cellular signals, including shifted first uplink signals and shifted second uplink signals; and
a cellular transport module (CETM) bypassing an active component of the CATV network, and communicating the shifted cellular signals over the CATV network between the CEEM and CMCA via the CETM;
wherein the active component is an amplifier.

16. The system according to claim 15, wherein the plurality of BTS includes at least three BTS.

17. The system according so claim 16, wherein the plurality of BTS includes a BTS of a GSM1800 system, a BITS of a UMTS system, and a BTS of a GSM900 system.

18. The system according to claim 15, wherein the frequency band higher than the television signals of the CATV network is a band of 945-1120 MHz.

19. The system according to claim 15, wherein the frequency band higher than the television signals of the CATV network is a band of 960-1155 MHz.

20. The system as set forth in claim 15, wherein the CEEM performs the steps of:
receiving downlink CATV signals from the CATV network;
the shifting of the original first downlink signals to provide the shifted first downlink signals and of the original second downlink signals to provide the shifted second downlink signals;
coupling the downlink CATV signals, the shifted first downlink signals, and also the shifted second downlink signals to provide a coupled downlink signal;
transporting the coupled downlink signal through the CATV network;
receiving a coupled uplink signal from the CATV network;
decoupling the coupled uplink signal to provide uplink CATV signals and the shifted cellular signals;
shifting the shifted first uplink signals to provide restored first uplink signals corresponding in frequency to the original first uplink signals, and shifting the shifted second uplink signals to provide restored second uplink signals corresponding in frequency to the original second uplink signals;
transporting the uplink CATV signals to the CATV network; and
transporting the restored first uplink signals and the restored second uplink signals to the cellular network.

21. The system as set forth in claim 20, wherein the CMCA performs the steps of:
receiving uplink CATV signals;
the receiving of the original first uplink signals and the original second uplink signals over a bi-directional antenna;
the shifting of the original first uplink signals to provide the shifted first uplink signals and the shifting of the original second uplink signals to provide the shifted second uplink signals;
coupling the uplink CATV signals, the shifted first uplink signals, and the shifted second uplink signals to provide a coupled uplink signal;
transporting the coupled uplink signal through the CATV network;
receiving the coupled downlink signal from the CATV network;
decoupling the coupled downlink signal to provide downlink CATV signals, the shifted first downlink signals, and the shifted second downlink signals;
shifting the shifted first downlink signals to provide restored first downlink signals corresponding in frequency to the original first downlink signals, and shifting the shifted second downlink signals to provide restored second downlink signals corresponding in frequency to the original second downlink signals;
transporting the downlink CATV signals to a television signal receiver; and
transmitting the restored first downlink signals and the restored second downlink signals over the bi-directional antenna.

22. The system as set forth in claim 20, further comprising:
injecting, at the CEEM, one or more pilot continuous wave (CW) frequencies in the coupled downlink signal; and
performing reverse frequency translation using the one or more pilot CW frequencies, at the CMCA, to perform the shifting of the shifted first and second downlink signals and the shifting of the original first and second uplink signals.

23. The system as set forth in claim 21, wherein the CETM performs the steps of:
receiving, as a coupled signal, one of the coupled uplink signal and the coupled downlink signal;
differentiating between CATV signals of the coupled signal and shifted first and second signals of the coupled signal;
passing the CATV signals of the coupled signal through the active component of the CATV network;
passing the shifted first and second signals of the coupled signal around the active component of the CATV network; and
after the passing steps, recombining the CATV signals of the coupled signal with the shifted first and second signals of the coupled signal to provide a signal for transmission over the CATV network.

24. The system as set forth in claim 23, further comprising:
injecting, at the CEEM, one or more pilot continuous wave (CW) frequencies in the coupled downlink signal; and performing reverse frequency translation using the one or more pilot CW frequencies, at the CMCA, to perform the shifting of the shifted first and second downlink signals and the shifting of the original first and second uplink signals.

25. An apparatus for supporting multi-band bidirectional cellular communication at an indoor termination point of a CATV network, comprising:
- a first frequency converter for:
  - converting original frequency uplink wireless RF signals of a first cellular system, received from an antenna, to corresponding first shifted uplink wireless RF signals, and
  - converting first shifted downlink wireless RF signals, received from the CATV network, to original frequency downlink wireless RF signals of the first cellular system; and
- a second frequency converter for:
  - converting original frequency uplink wireless RF signals of a second cellular system, received from an antenna, to corresponding second shifted uplink wireless RF signals, and
  - converting second shifted, downlink wireless RF signals, received from the CATV network, to original frequency downlink wireless RF signals of the second cellular system;
- wherein the shifted wireless RF signals have respective sub-band frequencies in accordance with a predetermined frequency plan; and
- wherein the shifted uplink wireless RF signals are in a band higher in frequency than CATV signals of the CATV network.

26. The apparatus as set forth in claim 25, further comprising a third frequency for:
- converting original frequency uplink wireless RF signals of a third cellular system, received from an antenna, to corresponding third shifted uplink wireless RF signals, and
- converting third shifted downlink wireless RF signals, received from the CATV network, to original frequency downlink wireless RF signals of the third cellular system.

* * * * *